April 1, 1924.

A. STEINLE

MEASURING APPARATUS

Filed June 5, 1922

1,488,564

Patented Apr. 1, 1924.

1,488,564

UNITED STATES PATENT OFFICE.

ADOLF STEINLE, OF JENA, GERMANY, ASSIGNOR TO THE FIRM OF CARL ZEISS, OF JENA, GERMANY.

MEASURING APPARATUS.

Application filed June 5, 1922. Serial No. 566,162.

*To all whom it may concern:*

Be it known that I, ADOLF STEINLE, a citizen of the German Empire, and residing at Jena, Germany, have invented a new and useful Measuring Apparatus (for which I have filed an application in Germany June 4, 1921), of which the following is a specification.

The present invention offers a new measuring apparatus for internal diameters which is adapted for very exact measurements and which not only admits of determining the diameter sought after but simultaneously shows up to which extent the surface to be examined is an exact rotating surface. For this purpose there is used a measuring apparatus having an adjustable caliper pin which is laid against the surface to be measured under invariable pressure.

Figure 1:
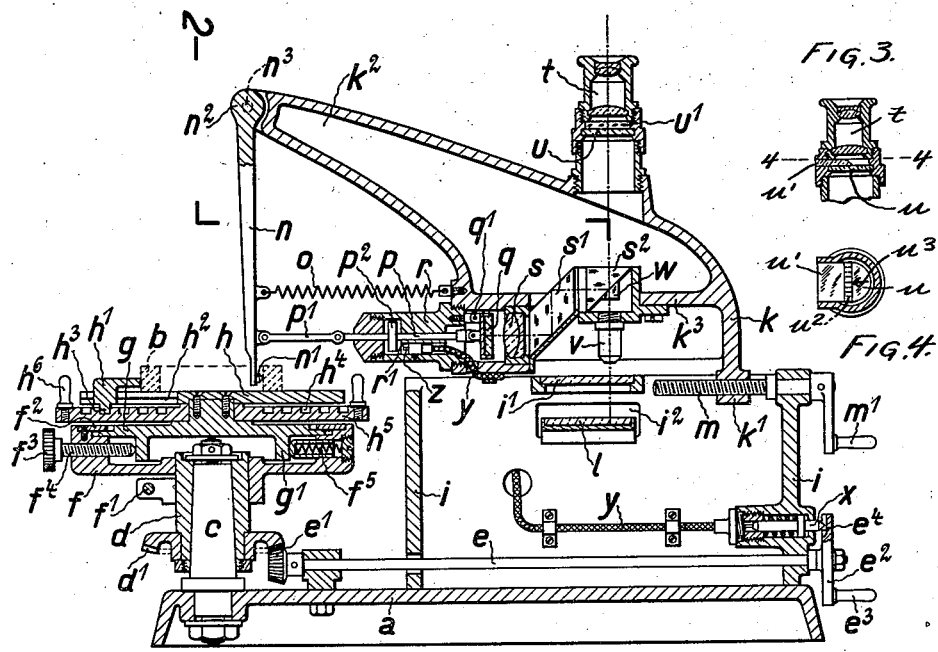
Figure 2:
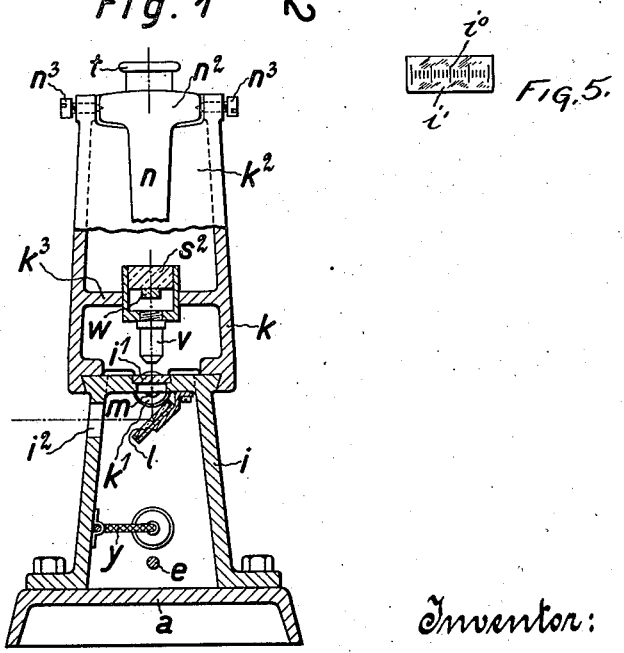

The annexed drawing shows a constructional example of a measuring apparatus according to the invention. Fig. 1 is a longitudinal section of the complete apparatus, Fig. 2 a cross section on the line 2—2 of Fig. 1, Fig. 3 a longitudinal section through the ocular, Fig. 4 a cross section of the ocular on the line 4—4 of Fig. 3 and Fig. 5 a front view of a single part.

The apparatus substantially consists of two parts disposed side by side on a common base plate $a$, viz, of the rotatable stage, provided with a centering device, upon which the object to be measured (in Fig. 1 a ring $b$ shown by dotted lines) is placed and secured, and of the measuring apparatus proper provided with a measuring slide carrying the feeling organ and being displaceable relatively to the stage in the measuring direction. The rotatable stage shown on the left in Fig. 1 has a perpendicular, conical axis $c$ which is rigidly fixed in the base plate $a$. Upon this axis $c$ there is rotatably disposed a sleeve $d$ with which a bevel wheel $d^1$ is rigidly connected. In the latter engages a bevel wheel $e^1$ disposed at the left end of a horizontal shaft $e$, the number of teeth of the bevel wheel $e^1$ being one quarter of that of the bevel wheel $d^1$. The shaft $e$, lying along the base plate $a$, carries at its right end a crank disc $e^2$ with a crank $e^3$ and is manually rotatable. On the rotatable sleeve $d$ there is a disc $f$ which is manually adjustable in the height direction and capable of being rigidly connected with the sleeve $d$ by tightening a set screw $f^1$. The disc $f$ has on its top a reinforced rim which carries a disc $g$ having a downwardly projecting extension $g^1$. The disc $g$ is held relatively to the disc $f$ by means of an overlapping ring $f^2$ which is screwed to the disc $f$. However, it is capable of being displaced perpendicularly to the axis $c$ within small limits. The adjustment takes place by means of two screws $f^4$ with milled heads $f^3$ which press upon the extension $g^1$ and coact with a counter spring $f^5$. Fig. 1 only shows one of the two screws $f^4$, the other one together with its counter spring is assumed to be disposed in the direction of the diameter perpendicular to the drawing plane, so that by actuating the two screws $f^4$ it is possible to exactly adjust the disc $g$ relatively to the disc $f$. A disc $h$ which forms the stage proper and upon which the object to be measured, $b$, is placed, is screwed to the disc $g$. The approximate centering and fixing of the object to be measured takes place after the manner of a clamping chuck by means of three blocks $h^1$ which slide within radial slits $h^2$ of the disc $h$ and engages by an extension $h^3$ each in a spiral groove $h^4$ of a disc $h^5$ disposed between the two discs $g$ and $h$. The disc $h^5$ has at its margin small handles $h^6$, so that it can be easily rotated by hand and thereby the blocks $h^1$ be pressed against the object to be measured.

On the right side of the base plate $a$ (Fig. 1) there is the measuring apparatus proper. On the base plate $a$ there is screwed a box-shaped part $i$ which forms on its top the guide bed of a slide $k$ displaceable in the measuring direction. About in the middle of the top the part $i$ is provided with a fixed glass plate $i^1$ upon which the scale $i^0$ (vide Fig. 5) serving for the measurement is disposed parallelly to the direction of displacement of the slide $k$. The illumination of this scale takes place from below through a lateral opening $i^2$ of the casing $i$ by means of a mirror $l$. The displaceable slide $k$, denoted hereinafter as measuring slide, carries the microscope, which serves for reading off the scale, as well as the feeling organ together with the appertaining parts. It is capable of being adjusted with the aid of a screw $m$ which is rigidly supported in the part $i$ and engages in an extension $k^1$ of the measuring slide $k$. The screw $m$ is manually rotated by means of a crank $m^1$. The measuring slide $k$ is provided with a lateral arm $k^2$ which extends across the rotatable stage of the measuring apparatus and from which suspends a caliper lever $n$. The latter carries at its bottom end, almost adjoining to the stage, a round point $n^1$ which represents the caliper point proper and which is laid against the internal surface to be measured at any one time. The caliper lever $n$ is so disposed relatively to the stage that the caliper point $n^1$ always deflects in a plane traversing the axis of rotation of the stage. With a view to neutralizing the moment of rotation exerted upon the caliper lever $n$ by the friction at the object to be measured $b$ during the rotation of the stage, the caliper lever $n$ has a comparatively long nave $n^2$ which is supported between adjustable pointed screw $n^3$. By means of a spring $o$ stretched between the caliper lever $n$ and the measuring slide $k$, the caliper lever $n$ is always pressed against the surface to be measured with almost invariable force. In addition, the caliper lever $n$ is hingedly connected by a rod $p^1$ and a rod $p$, guided parallelly to the measuring direction, with a displaceable mirror $q$, which is supported on the measuring slide $k$, and which owing to the motions of the caliper lever undergoes rotations relatively to the slide $k$ about a pivot $q^1$, rigidly disposed on the latter. The rod $p$ is guided within a bush $r$ which is screwed on the measuring slide $k$ and which simultaneously confines by means of a collar $p^2$, disposed on the rod $p$, the lift of the rod $p$ and thereby the deflection of the caliper lever $n$ to the requisite small extent. The rotatable mirror $q$ coacts with an autocollimation telescope also connected to the measuring slide $k$, the objective of this telescope being denoted by $s$ and the ocular by $t$. The rays are first displaced a little upwardly behind the objective $s$ by a rhombic reflecting prism $s^1$ and thereupon transmitted by a single reflecting prism $s^2$ into the vertically disposed ocular $t$. In front of the latter there is a plane-parallel glass plate $u$ which carries on its rear surface, coinciding with the ocular focal plane, the scale $u^2$ and pointer $u^3$ required for autocollimation telescopes. The scale is laterally illuminated in the usual way by means of a reflecting prism $u^1$ which even covers the scale for an observer looking into the ocular so as to render visible only the pointer and the image of the scale reflected by the mirror $q$. In addition, the ocular $t$ serves simultaneously as an ocular for the reading microscope of the scale. The appertaining microscope objective $v$ is fixed above the glass plate $i^1$, carrying the scale, on a partition wall $k^3$ of the measuring slide $k$. In order to conduct the rays emanating from the microscope objective $v$ through the reflecting prism $s^2$ of the autocollimation telescope, a second, smaller prism $w$ is cemented upon the hypotenusal surface of the prism $s^2$, so that for the rays, traversing the microscope, the two prisms $s^2$ and $w$ coact as a plane-parallel plate. In addition, there is an arrangement by which the caliper pin $n^1$, on the stage being rotated, is automatically lifted off the surface to be measured and by which it only acts at four points of the circumference, being apart by 90° each. For this purpose the crank-disc $e^2$ serving for actuating the stage is provided with a notch $e^4$ which coacts with a pin $x$, being under spring pressure and displaceable in the wall of the part $i$ of the casing. The pin $x$ generally slides, on the crank-disc $e^2$ being rotated, on the smooth surface facing the pin but somewhat projects at the notch $e^4$ owing to the spring action. The motion to and fro thus produced of the pin $x$ is transmitted by a Bowden wire $y$, which is conducted from the fixed lower part $i$ to the measuring slide $k$, to a second pin $z$ in a bore $r^1$ of the bush $r$ which pin is so disposed relatively to the collar $p^2$ of the rod $p$ that the caliper lever $n$ is only capable of moving within the given play if the pin $x$ has caught the notch $e^4$ of the disc $e^2$. As the ratio of gear of the bevel wheels $e^1$ and $d^1$ is 1:4, the caliper lever $n$ only acts at four points of the circumference, whilst with the intermediate rotary motions of the stage it remains inoperative by means of the pin $z$.

The operation of the apparatus takes place as follows. The object to be measured is placed on the lowered table and approximately centered and fixed by rotating the disc $h^5$ by means of the handles $h^6$. Thereupon, after the set screw $f^1$ having been loosened, the stage is lifted so far that the breadth circle to be measured of the object $b$ is on a level with the caliper point $n^1$. Hereafter the measuring slide $k$ is displaced to the right by rotating the crank $m^1$ until the caliper point $n^1$ touches the object to be measured. In that case the disc $e^2$ and thereby the pins $x$ and $z$ are supposed to have the position shown in Fig. 1 and the caliper lever $n$ can therefore freely move within the given lift. As soon as the caliper point $n^1$ touches the object to be measured $b$, the scale of the autocollimation telescope, on the measuring slide $k$ being further displaced, begins to travel in the field of view of the observer. Now the measuring slide $k$ is suitably adjusted in such a way that the caliper lever is capable of deflecting nearly to the same extent to either side. Thereupon, by means of rotating the crank $e^3$ the centering of the object to be measured is examined by looking with each catch of the pin $x$ into the notch $e^4$ whether the scale of the autocollimation telescope has changed its position. If such be the case, the object to be measured is not stretched coaxially with the axis of rotation of the stage. Hence by rotating the two screws $f^3$, the object to be measured is displaced perpendicularly to the axis of the stage until these changes of position are compensated and the scale of the autocollimation telescope always retains the same position with four consecutive rotations of the crank $e^3$. If this be the case, the axis of the rotating surface to be measured is warranted to coincide with the axis of rotation of the stage and the radius sought may be gathered from the position of the measuring slide by bringing the scale of the autocollimation telescope by rotating the crank $m^1$ into its middle position and by then reading off the value sought on the scale of the plate $i^1$. Inversely, it would also be possible by rotating the crank $m^1$ to adjust on the scale of the plate $i^1$ for the nearest division and to read off the appertaining subunits of the value sought on the scale of the autocollimation telescope.

I claim:

In a measuring apparatus for determining the internal diameters of rotary bodies a base plate, a stage, means adapted to support this stage on the base plate rotatably about an axis, a clamping device supported on this stage comprising a plurality of blocks radially displaceable and adapted to adjust the rotary body to be measured coaxially with the axis of rotation of the said stage, a caliper pin, means adapted to support this caliper pin on the base plate movably about an axis perpendicular to the said axis of rotation, a scale and an index displaceable relatively to one another, one of which two parts is fitted to the base plate, and means operatively connecting the caliper pin and the other of the said two parts.

ADOLF STEINLE.

Witnesses:
PAUL KRÜGER,
FRITZ LANDER.